US007814642B1

(12) United States Patent
Onimaru et al.

(10) Patent No.: US 7,814,642 B1
(45) Date of Patent: Oct. 19, 2010

(54) STATOR OF ELECTRIC ROTATING MACHINE

(75) Inventors: Sadahisa Onimaru, Chiryu (JP); Hirohito Matsui, Okazaki (JP); Hirofumi Kinjo, Oobu (JP); Katsuhiko Oka, Kariya (JP); Shinji Kouda, Kariya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 12/801,706

(22) Filed: Jun. 22, 2010

Related U.S. Application Data

(62) Division of application No. 12/423,876, filed on Apr. 15, 2009.

(30) Foreign Application Priority Data

Apr. 18, 2008 (JP) ............................ 2008-109549

(51) Int. Cl.
*H02K 15/00* (2006.01)

(52) U.S. Cl. ................................ 29/596; 310/216.004

(58) Field of Classification Search .................. 29/596; 310/216.004, 216.007, 218.008, 216.009, 310/216.048, 216.051

See application file for complete search history.

(56) References Cited

U.S. PATENT DOCUMENTS

| | | | | |
|---|---|---|---|---|
| 6,317,962 | B1 | 11/2001 | Adachi et al. | |
| 6,525,444 | B2 | 2/2003 | Salem et al. | |
| 6,630,766 | B1 * | 10/2003 | Kirn et al. | 310/418 |
| 7,170,206 | B2 | 1/2007 | Laxenaire et al. | |
| 2002/0158539 | A1 | 10/2002 | Oohashi et al. | |
| 2007/0170805 | A1 * | 7/2007 | Tamaoka | 310/216 |
| 2009/0261684 | A1 | 10/2009 | Onimaru et al. | |

FOREIGN PATENT DOCUMENTS

| | | |
|---|---|---|
| JP | 09-103052 | 4/1997 |
| JP | 3604326 | 10/2004 |

* cited by examiner

*Primary Examiner*—Nguyen N Hanh
(74) *Attorney, Agent, or Firm*—Nixon & Vanderhye PC

(57) ABSTRACT

A method of manufacturing an electric rotating machine having a stator that includes a stator core having slots formed at an inner periphery thereof, and a stator winding constituted by conductive wires wound on the slots. The stator winding includes in-slot portions accommodated in the slots and turn portions each connecting each adjacent two of the in-slot portions outside the slots. The stator core includes a core member having at least three tooth portions extending in a radial direction of the stator core and a core back portion integrally connecting the tooth portions at a radially end side thereof. The core member is configured such that each of the first tooth portions folded toward the core back portion is capable of unfolding to extend between a corresponding adjacent two of the in-slot portions when the core member is at a predetermined axial position with respect to the stator winding.

16 Claims, 15 Drawing Sheets

4
320
321
32
44
320
321
32
32
32

3
4
32
33
33
34
34

4
32
32
32
32
321
321
320
320
44

34
33
33
33
4
32
32
34

4
32
32
32
32
321
320

STATOR OF ELECTRIC ROTATING MACHINE

CROSS-REFERENCE TO RELATED APPLICATION

This application is a Division of application Ser. No. 12/423,876, filed Apr. 15, 2009, which claims priority from and is based on Japanese Patent Application No. 2008-109549 filed on Apr. 18, 2008, the contents of each of which are hereby incorporated by reference.

BACKGROUND OF THE INVENTION

1. Field of the Invention

The present invention relates to a stator of an electric rotating machine, and an electric rotating machine having the stator.

2. Description of Related Art

In recent years, there is a growing need of electric rotating machines usable as electric motors or generators which are compact in size and of high quality.

For example, an electric rotating machine mounted on a vehicle is required to generate more output power because of an increase of vehicle loads, although the space assigned to mount the electric rotating machine in an engine compartment is becoming smaller.

As described, for example, in Japanese Patent No. 3604326, there is known a compact and high-output electric rotating machine having a structure in which the resistance of phase windings thereof is small, the lamination factor of electric conductors accommodated in the magnetic circuit of a stator thereof is large, and the turn portions of the phase windings are in proper alignment and wound densily.

This patent document describes, as an assembling method of the stator, a step of preparing a stator winding of a predetermined shape by winding pillar-conductors in the circumferential direction a plurality of times so as to be laminated in the slot direction (in the radial direction), a step of disposing a plurality of divided cores in a ring around the outer periphery of the stator winding in a state of being overlapped at their lap portions, a step of moving the divided cores radially inwardly so that they are inserted into the stator winding, and a step of fixing the divided cores to one another.

However, the stator of an electric rotating machine of the type in which its stator core is constituted by a plurality of divided cores has a problem in that it is difficult for the electric rotating machine to output a sufficiently large power, because the divided portions (surfaces of the divided cores) have a magnetic resistance.

Although the above patent discloses reducing the magnetic resistance by the provision of the lap portions, the effect is restrictive.

In addition, there is another problem that an eddy current occurs in each lap portion, causing iron loss (core loss) to increase.

SUMMARY OF THE INVENTION

The present invention provides a stator of an electric rotating machine comprising:

a stator core having slots formed at an inner periphery thereof along a circumferential direction thereof; and a stator winding constituted by conductive wires wound on the slots the stator winding including in-slot portions accommodated in the slots and turn portions each connecting each adjacent two of the in-slot portions outside of the slots, the stator core including a core member having at least three first tooth portions extending in a radial direction of the stator core and a core back portion integrally connecting the first tooth portions at a radially end side thereof, the core member being configured such that each of the first tooth portions folded toward the core back portion is capable of unfolding to extend between a corresponding adjacent two of the in-slot portions when the core member is at a predetermined axial position with respect to the stator winding.

According to the present invention, there is provided a compact and high-output electric rotating machine including a stator having less magnetic resistance in a stator core thereof.

Other advantages and features of the invention will become apparent from the following description including the drawings and claims.

PREFERRED EMBODIMENTS OF THE INVENTION

First Embodiment

Figure 1:
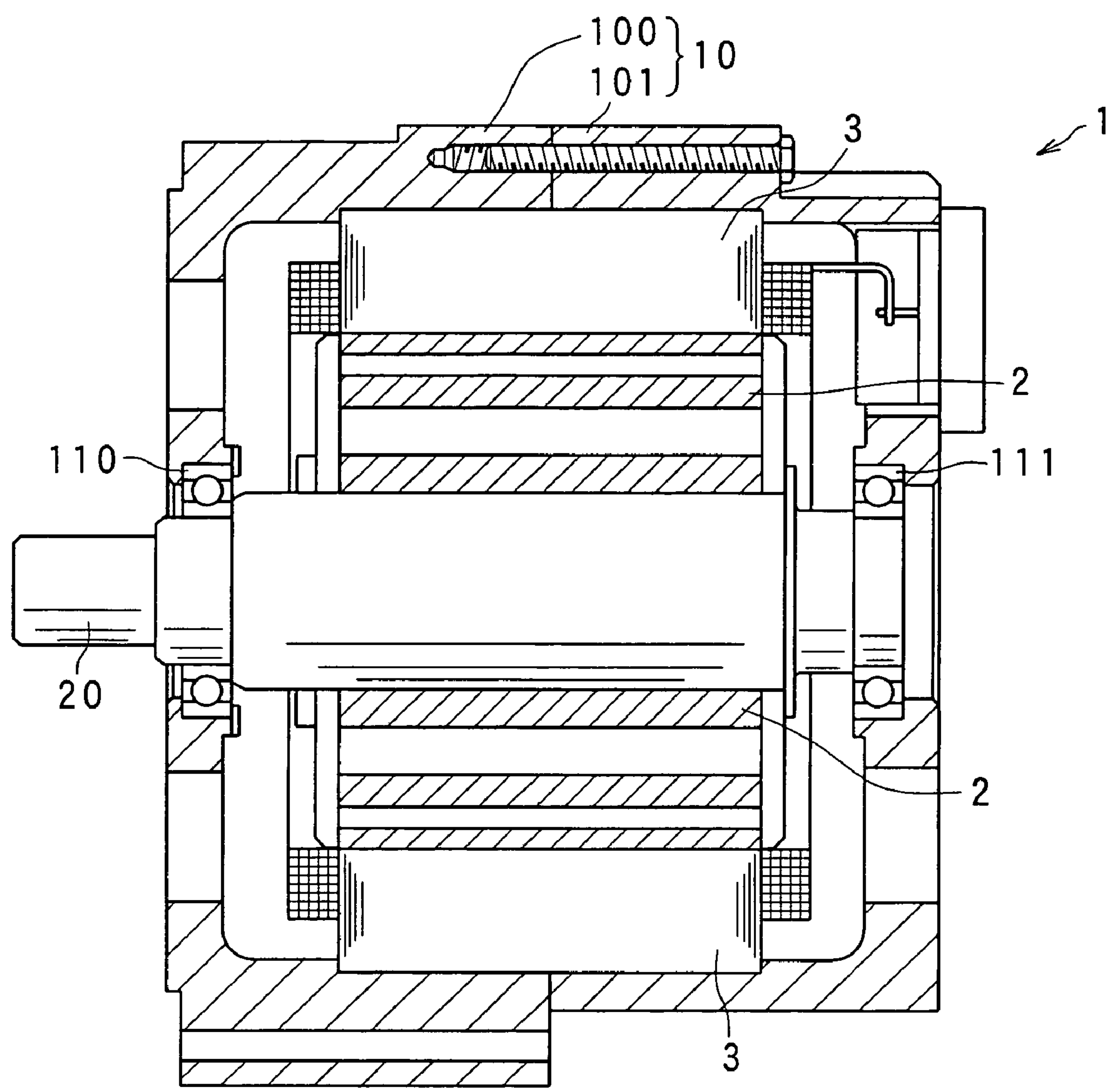
FIG. 1 is a diagram showing a structure of an electric rotating machine according to a first embodiment of the invention.

Fig. is a diagram showing a structure of an electric rotating machine 1 according to a first embodiment of the invention. As shown in this figure, the electric rotating machine 1 includes a housing 10 constituted by a pair housing members 100 and 101 each having a bottomed tubular shape and joined to each other at their opening portions, a rotor 2 fixed to a rotating shaft 20 rotatably supported by the housing 10 through bearings 110 and 111, and a stator 3 fixed to the housing 10 so as to surround the rotor 2 inside the housing 10.

The rotor 2 is provided with a plurality of magnetic poles (S poles and N poles) formed in the outer periphery of the rotor 2 facing the inner periphery of the stator 3, such that different poles alternate in the circumferential direction of the rotor 2.

The stator 3 includes a stator core 30, and a three-phase stator winding 4 constituted by a plurality of phase windings.

The stator core 30 has a shape of a circular ring formed with slots 31 at its inner periphery. The depth direction of each slot 31 coincides with the radial direction of the stator core 30.

Figure 2:
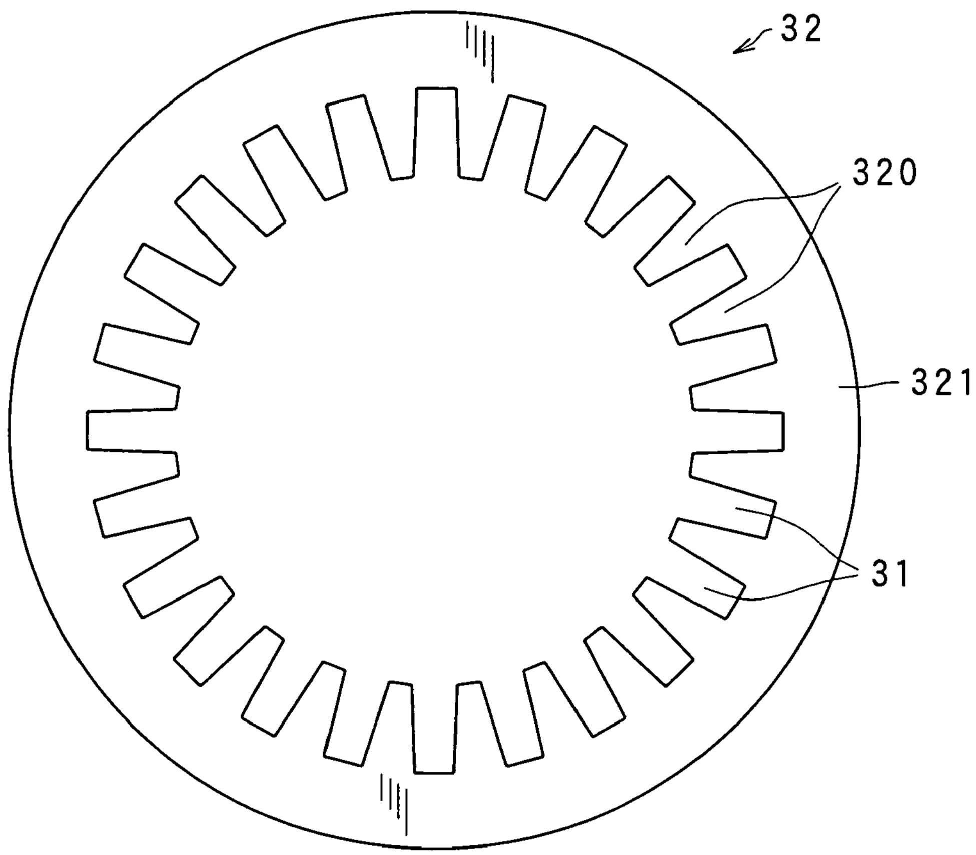
FIG. 2 is a diagram showing a core member constituting a stator of the electric rotating machine according to the first embodiment of the invention.

The stator core 30 includes core members 32. As shown in FIG. 2, the core member 32 is constituted by a plurality of tooth portions 320 arranged in the circumferential direction, and a core back portion 321 having a nearly circular ring shape disposed radially outward of the tooth portions 320 and being integral with the tooth portions 320. The core member 32 is formed by shaping an amorphous metal plate 25 μm thick (Optronics Co., Ltd. make, product name: METGLAS2605TCA). Since the core member 32 is made of a thin metal plate, it is flexible.

Figure 3:
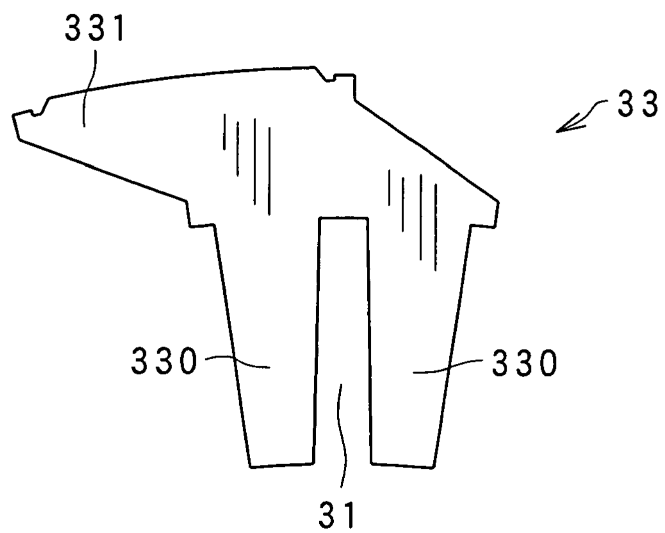
FIG. 3 is a diagram of divided core members constituting the stator of the electric rotating machine according to the first embodiment of the invention.
Figure 4:
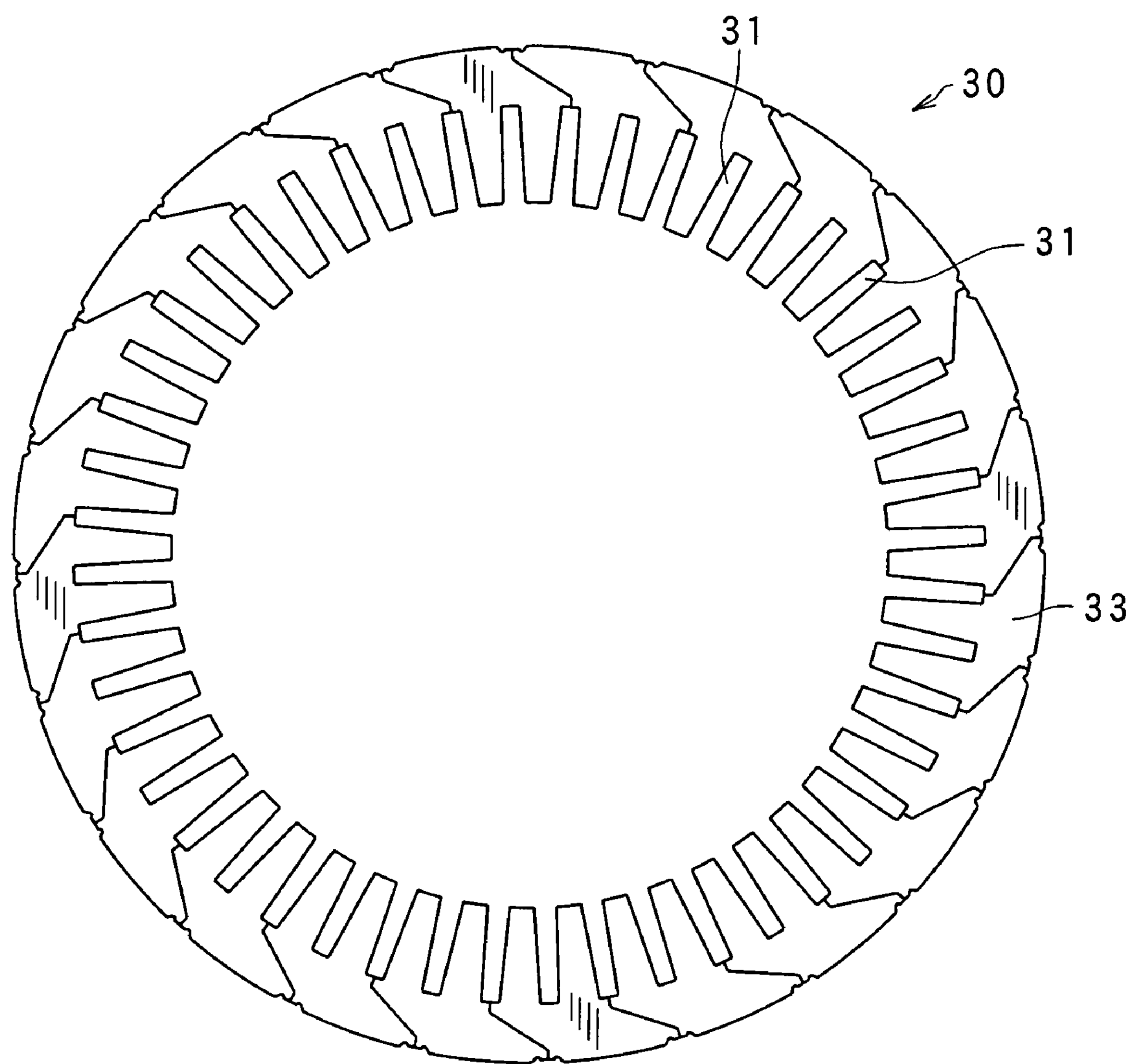
FIG. 4 is a diagram showing the divided core members disposed in a ring.

The stator core 30 further includes divided core members 33. As shown in FIG. 3 the divided core member 33 includes two tooth portions 330 and a core back portion 331 of a roughly arc shape disposed radially outward of the tooth portions 330 and being integral with the tooth portions 330. The divided core member 33 is formed by shaping an electromagnetic steel plate of 0.35 mm thick. Since the divided core member 33 is made of a relatively thick metal plate, it does not have flexibility. FIG. 4 is a diagram showing the divided core members 33 arranged in a circle.

Figure 5:
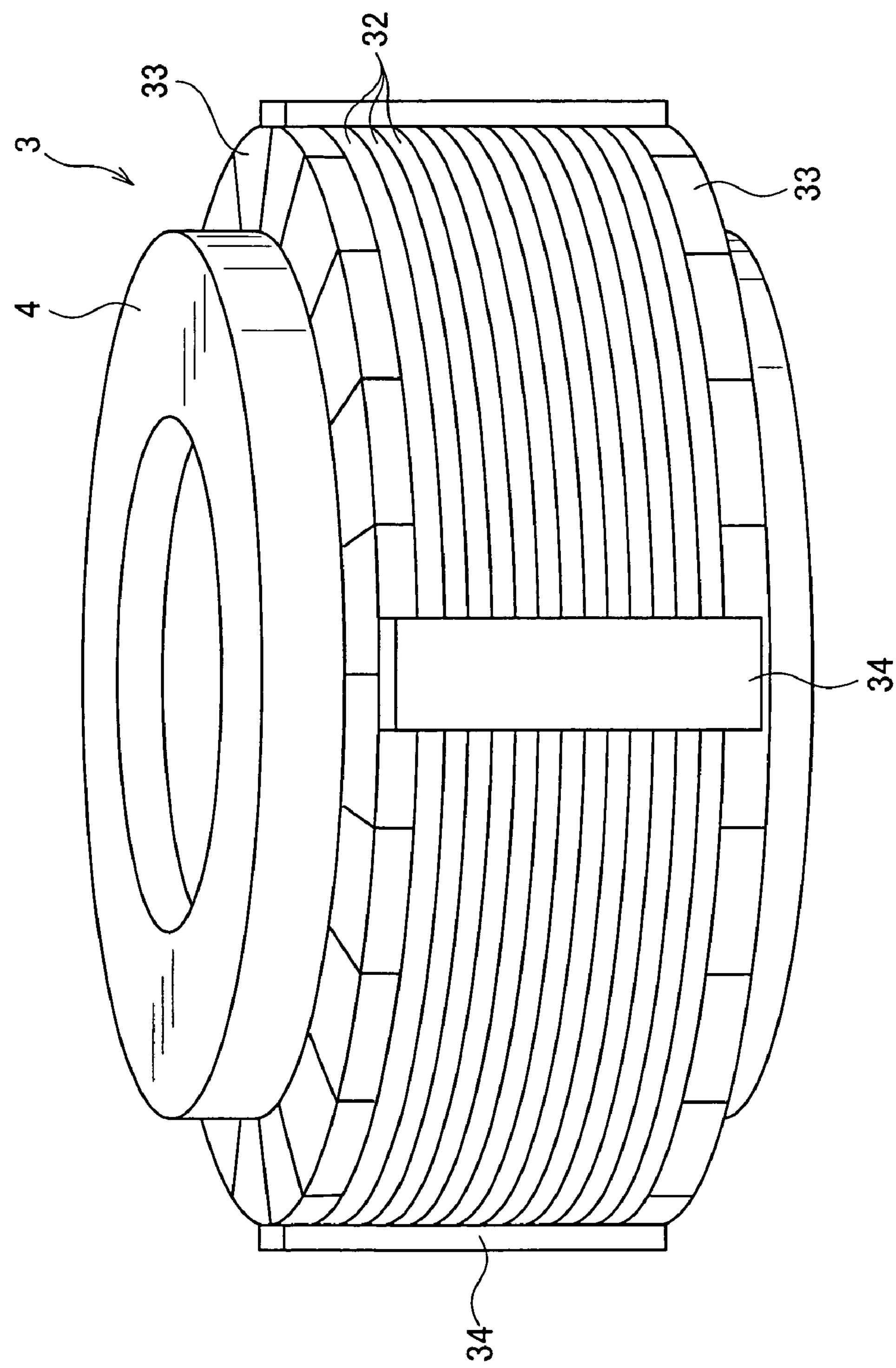
FIG. 5 is an outline view of the stator of the electric rotating machine according to the first embodiment of the invention.

As shown in FIG. 5, the stator core 30 is formed by laminating the core members 32 and the divided core members 33. The core members 32 and the divided core members 33 are fixed to one another by fittings 34 made of stainless steel.

Figure 6A:
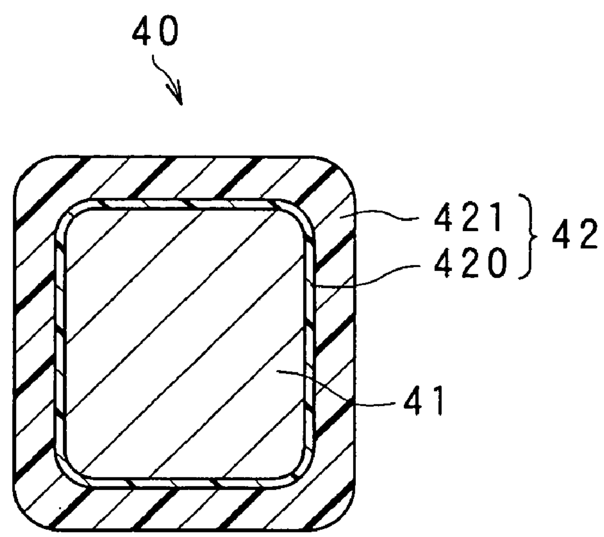
FIGS. 6A and 6B are diagrams showing cross sections of phase windings constituting a stator winding of the electric rotating machine according to the first embodiment of the invention.

The stator winding 4 is constituted by a plurality of windings 40 wound together in a given way. As shown in FIG. 6A, each of the windings 40 includes a conductor 41 made of copper or aluminum and an insulating film 42 constituted by an inner layer 420 and an outer layer covering the outer surface of the conductor 41. The thickness of the insulating film 42 is between 100 μm and 200 μm. Since the insulating film 42 is sufficiently thick, it is not necessary to interpose insulating paper or the like between each of the wirings 40 for insulation therebetween. However, insulating paper or the like may be interposed between each of the wirings 40.

The outer layer 421 is made of insulating material such as nylon, and the inner layer 420 is made of insulating material having a glass transition temperature higher than that of the outer layer 421 such as thermoplastic resin or polyamideimide. Accordingly, since the outer layer 421 crystallizes at an earlier time than the inner layer 420 when the electric rotating machine 1 generates heat, the surface hardness of the winding 40 increases, and accordingly, the winding 40 is difficult to scratch.

Figure 6B:
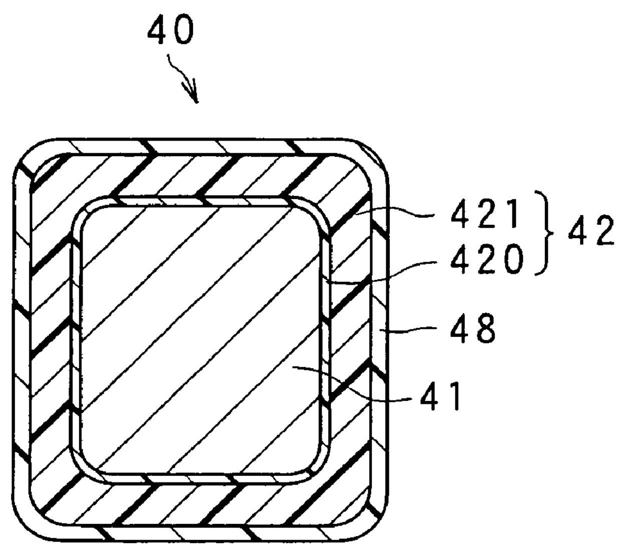

As shown in FIG. 6B, the outer surface of the insulating film 42 of the winding 40 may be coated with a fusion member 48 made of fusion material such as epoxy resin. The fusion member 43 melts at an earlier time than the insulating film 42 when the electric rotating machine 1 generates heat, and accordingly, windings 40 accommodated in the same slot 31 heat-adhere to one another through their fusion members 43. As a result, since the windings 40 accommodated in the same slot 31 become integrated and rigid, the mechanical strength of the windings 40 increases.

Figure 7:
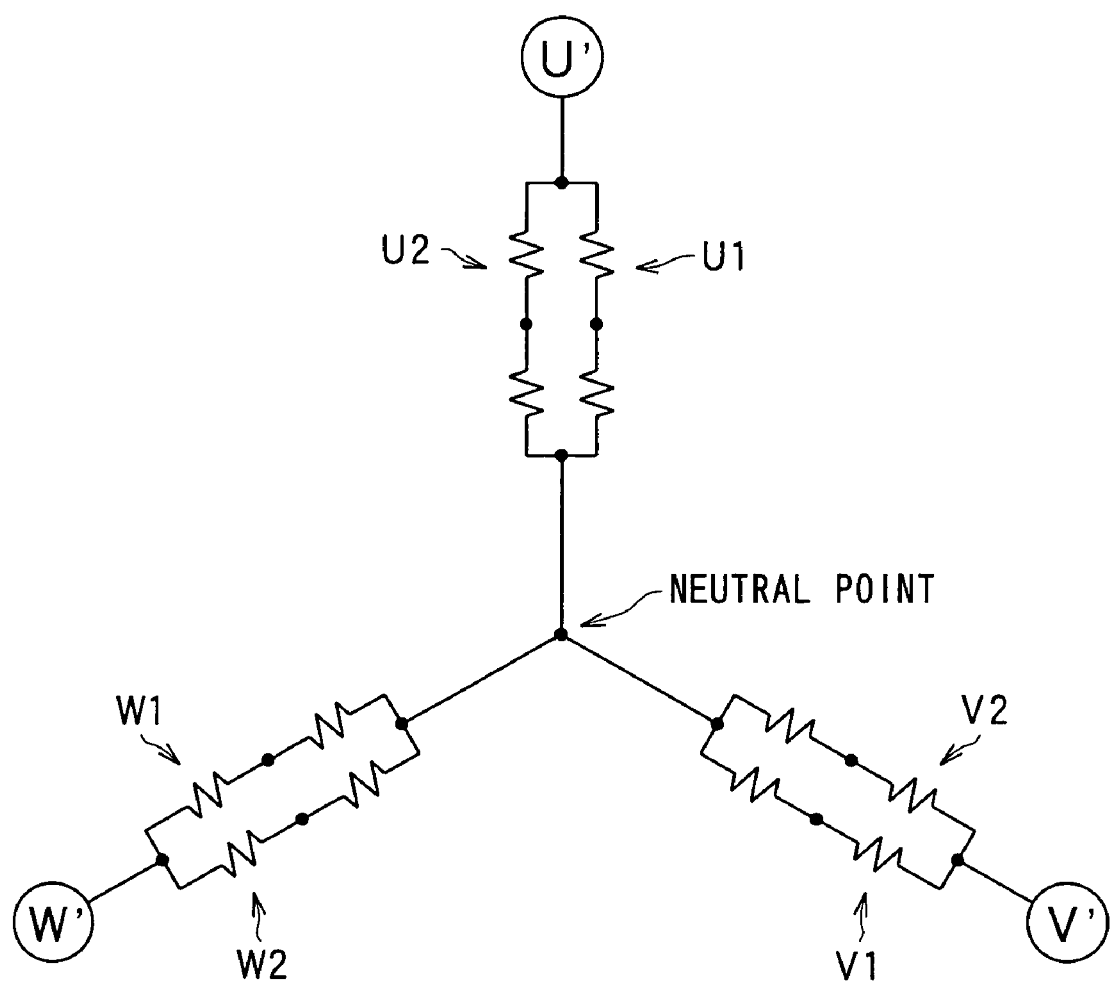
FIG. 7 is a diagram showing electrical connection of the phase windings of a stator winding of the electric rotating machine according to the first embodiment of the invention.

In this embodiment, as shown in FIG. 7, the stator winding 4 is constituted by two sets of three-phase windings (windings U1, U2, V1, V2, W1 and W2).

Figure 8:
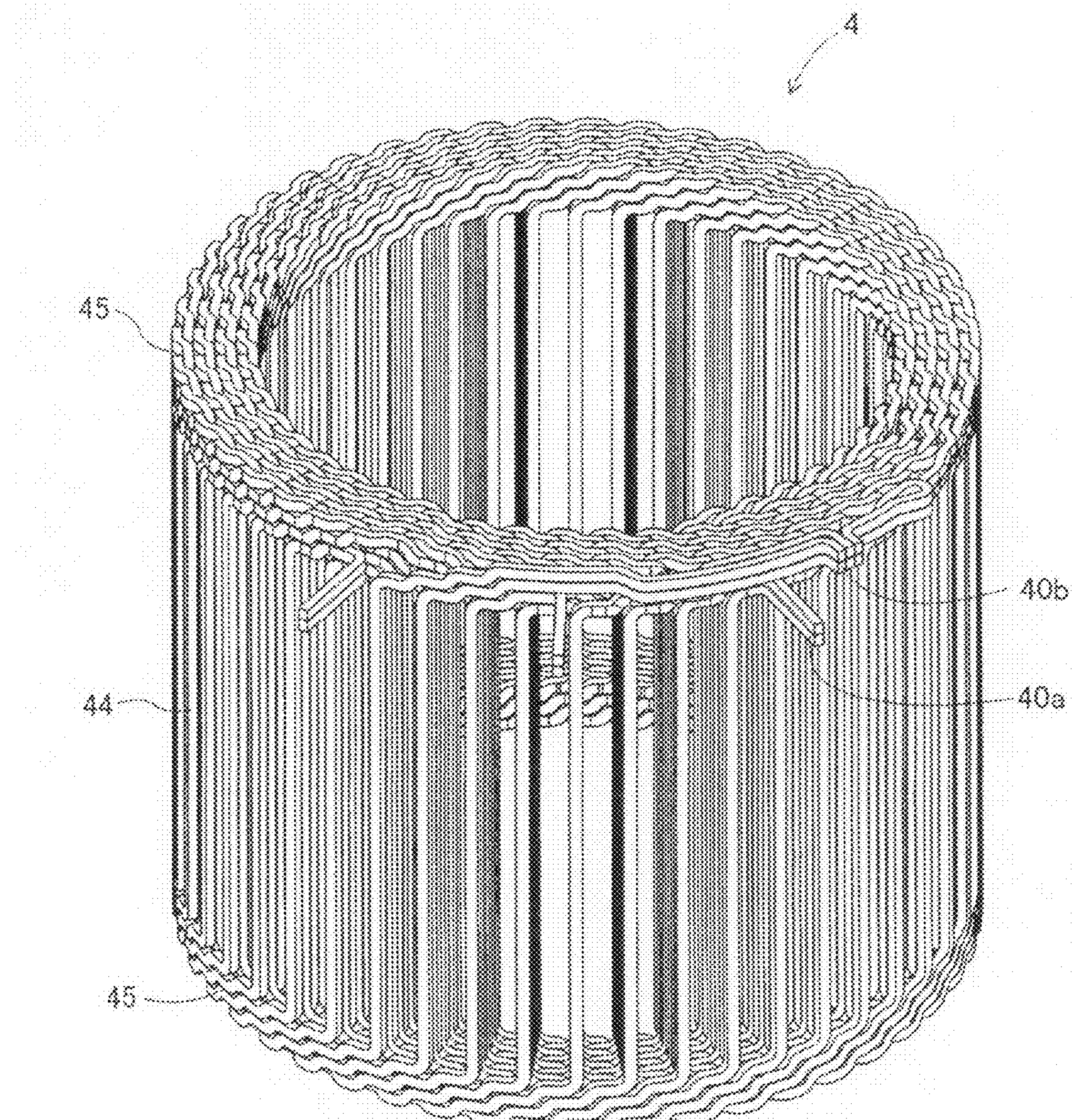
FIG. 8 is a perspective view of the stator winding of the electric rotating machine according to the first embodiment of the invention.

As shown in FIG. 8, the stator winding 4 is constituted by the windings 40 wound together in a predetermined shape. Each of the windings 40 is wave-wound along the circumferential direction on the side of the inner periphery of the stator core 30. Each of the windings 40 includes in-slot portions 44 of a linear shape accommodated in the slots 31, and turn portions 45 connecting the adjacent in-slot portions 44 to each other. The in-slot portions 44 of the same winding 40 are accommodated in every predetermined number of the slots 31 (every six slots 31 in this embodiment). The turn portions 45 project from the axial ends of the stator core 30.

Each of the windings 40 is wave-wound along the circumferential direction with one end thereof being projected from the axial end of the stator core 30. One phase winding of the stator winding 4 is constituted by two of the winding 40 wave-wound along the circumferential direction and connected to each other at other ends thereof. The in-slot portions 44 of these two windings 40 are accommodated in the same slots 31. The in-slot portions 44 of a first one of the two windings 40 (hereinafter referred to as the winding 40*a*) and the in-slot portions 44 of a second one of the two windings 40 (hereinafter referred to as the winding 40*b*) are accommodated such that they alternate in the depth direction in the slots. A connecting portion 45 at which the first and second windings 40*a* and 40*b* are connected to each other is formed as a turn-round portion 46 constituted by a specific one of the in-slot portions 44.

Figure 9:
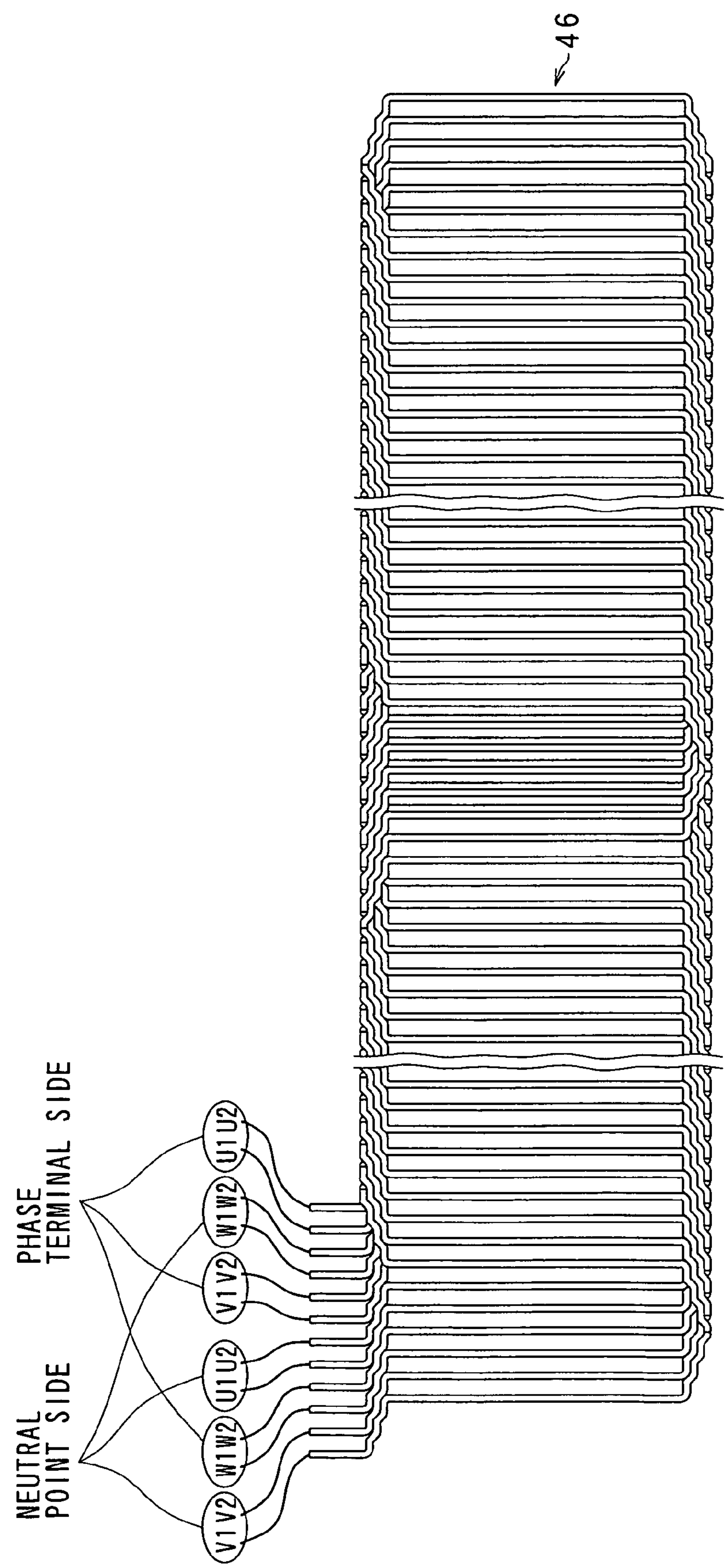
FIG. 9 is an exploded view of the stator winding of the electric rotating machine according to the first embodiment of the invention.
Figure 10:
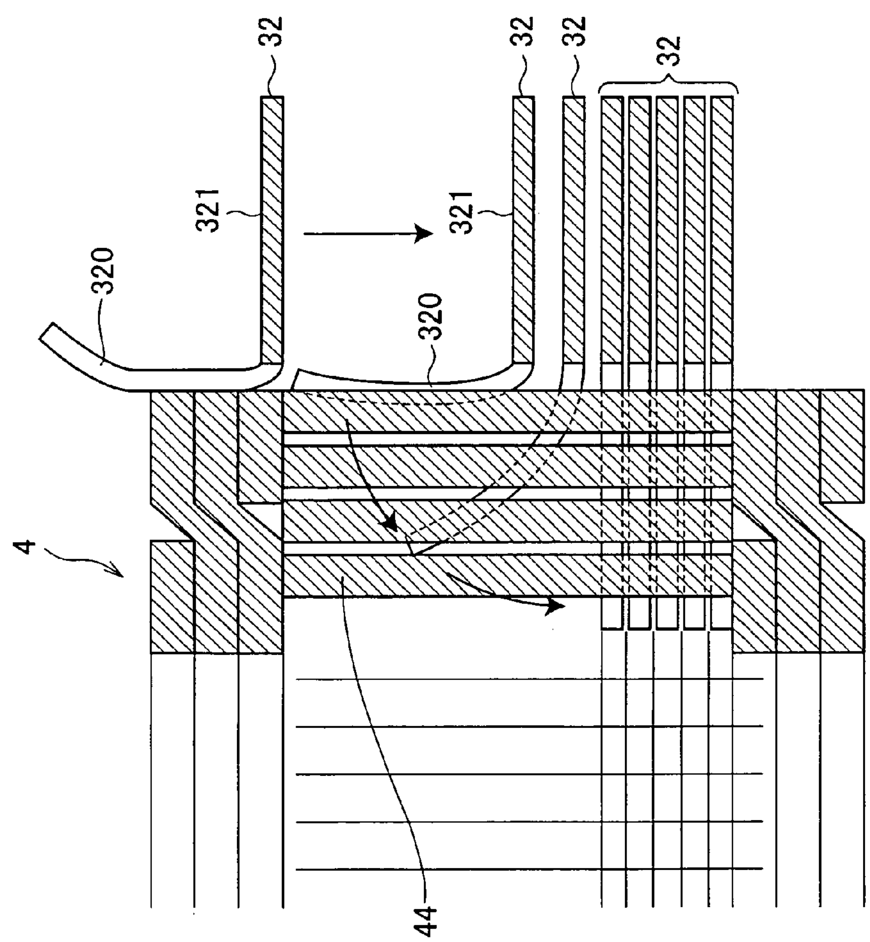
FIG. 10 is a diagram for explaining a method of assembling the stator of the electric rotating machine according to the first embodiment of the invention.

As shown in FIG. 9, the stator winding 4 is constituted by six phase windings (U1, U2, V1, V2, W1 and W2) each of which is constituted by the first and second windings 40*a* and 40*b*. The first and second windings 40*a* and 40*b* of each of the phase windings are connected in series to each other at their ends not connected to the neutral point, or phase terminals.

The stator winding 4 is fabricated by preparing a wire assembly as shown in FIG. 9, and convolving this wire assembly by a predetermined number of times (four times, for example) with the turn-round portions 46 being located on the axial center side. As shown in FIG. 8, the fabricated stator winding 4 is shaped such that the in-slot portions 44 of each of the phase windings are lined in the radial direction, and spaced by a small distance along the circumferential direction.

The stator core 30 is assembled to the stator winding 4 in the following way to manufacture the stator 3 of the electric rotating machine.

First, the tooth portions 320 of the core member 32 are folded back radially outwardly toward the core back portion 321. As a result, a hollow portion is formed having a diameter slightly larger than that of the stator winding 4 at the axial center portion of the core member 32. In the state of the tooth portions 320 being folded back, the stator winding 4 is inserted into the hollow portion, and the core member 32 is slid along the axial direction of the core member 32. When the core member 320 reaches a position which is at a predetermined distance from the axial end of the stator winding 4, the tooth portions 320 which have been folded back unfold and extended radially inwardly to return to their original shape (the shape of thin plate) due to their resiliency. As a result, each of the tooth portions 320 radially penetrates between the adjacent in-slot portions of the stator winding 4. Thus, each of the in-slot portions 44 is accommodated between each adjacent two of the tooth portions 320.

In this state, the core member 32 is slid to a predetermined axial position of the stator winding 4, and held there.

In this way, a predetermined number of the core members 32 are assembled to the stator winding 4 successively.

In the above way, the tooth portions 320 penetrate through the stator winding 4 by their self-unfolding movement when the core member 32 is assembled. However, the folded tooth portions 320 may be unfolded by use of an appropriate jig.

Figure 11:
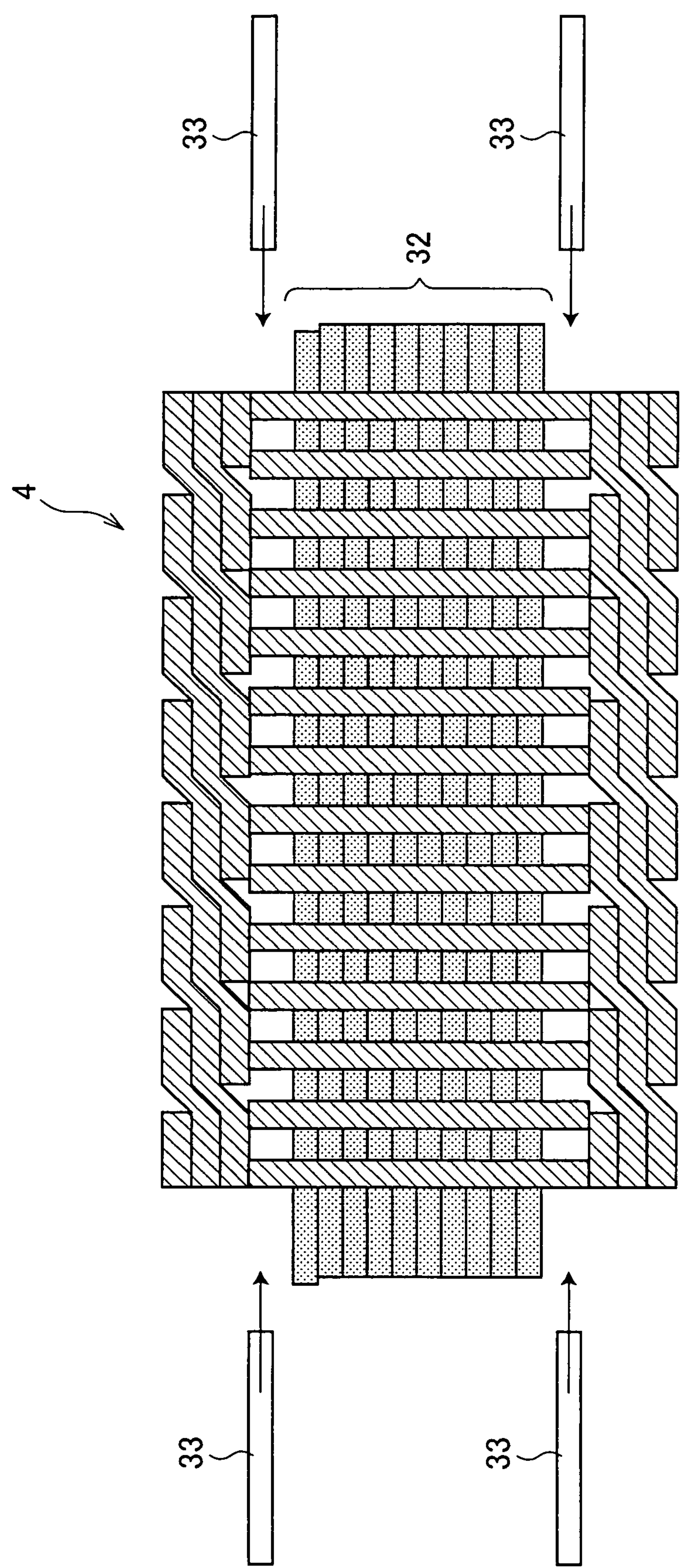
FIG. 11 is a diagram for explaining a method of assembling the stator of the electric rotating machine according to the first embodiment of the invention.

Thereafter, as shown in FIG. 11, the divided core members 33 are assembled to both axial ends of the laminated core members 32. The divided core members 33 are assembled in a direction from radially outside of the stator winding 4 to the axial center of the stator winding 4. By assembling the divided core members 33, gaps between the both end surfaces of the laminated core members 32 and the end surfaces of the stator winding 4 are filled.

At the time of laminating the core members 32 and the divided core members 33, an insulating film may be inserted between each of them.

The laminated body of the core members 32 and the divided core members 33 is fitted with band-like fittings 34 to complete the stator core 30. It is preferable that the laminated body is compressed in the axial direction at this time. The stator core 30 has high rigidity because the divided core members 33 and the fittings 34 are joined together. In this embodiment, although the fittings 34 are joined to the divided core members 33, they may be joined to the core members 32.

As apparent from the above description, since the stator 3 of the electric rotating machine 1 of this embodiment is not divided in the circumferential direction, the magnetic characteristic is not degraded unlike the conventional stator constituted by a plurality of divided cores in which its magnetic characteristic is degraded at the boundaries between each of the divided cores. Therefore, the electric rotating machine 1 of this embodiment can prevent lowering of performance due to degradation of the magnetic characteristic.

In addition, in this embodiment, since the core member 32 is made of amorphous metal, iron loss of the stator core 30 is small, and accordingly, degradation of the magnetic characteristic of the stator core 30 due to iron loss can be also suppressed. The effect of the reduction of iron loss becomes large as the rotational speed of the rotor increases.

Second Embodiment

Figure 12:
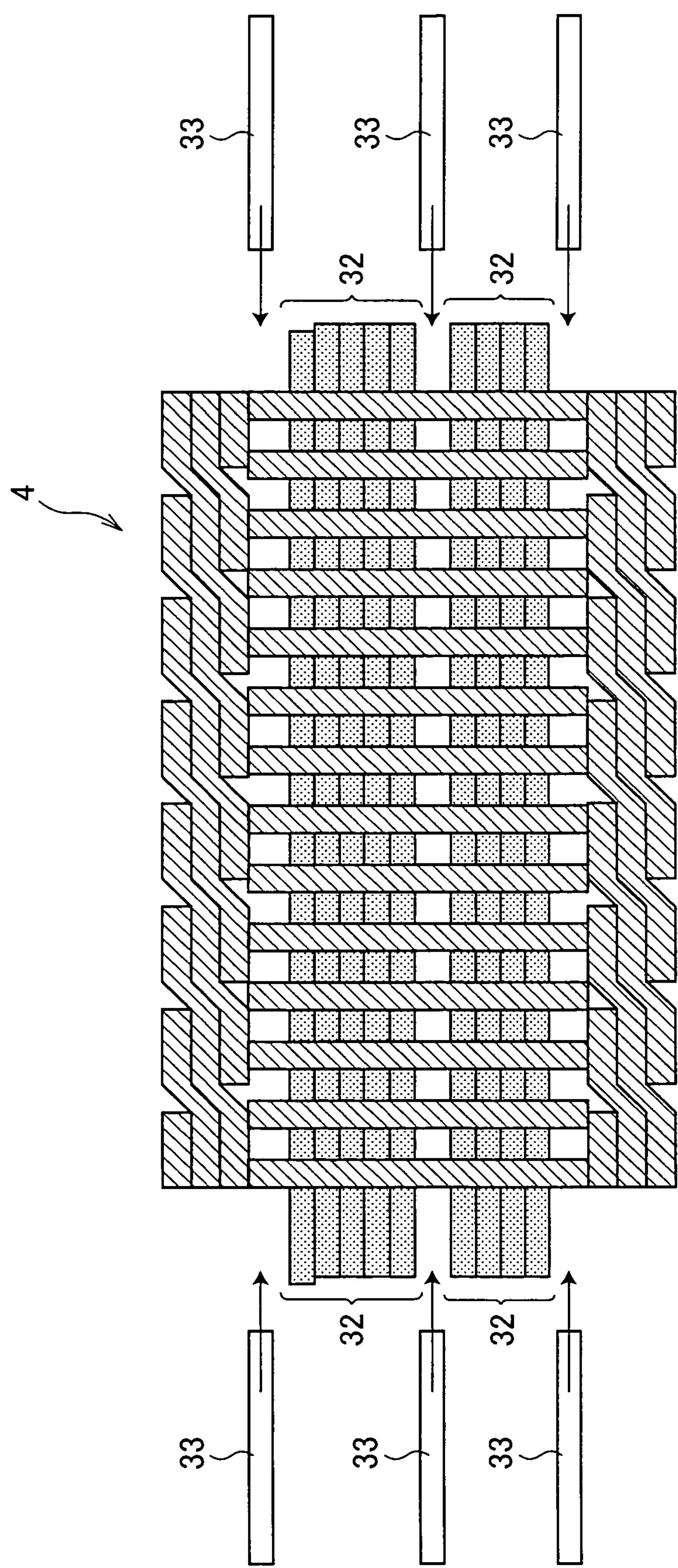
FIG. 12 is a diagram for explaining a method of assembling a stator of the electric rotating machine according to a second embodiment of the invention.
Figure 13:
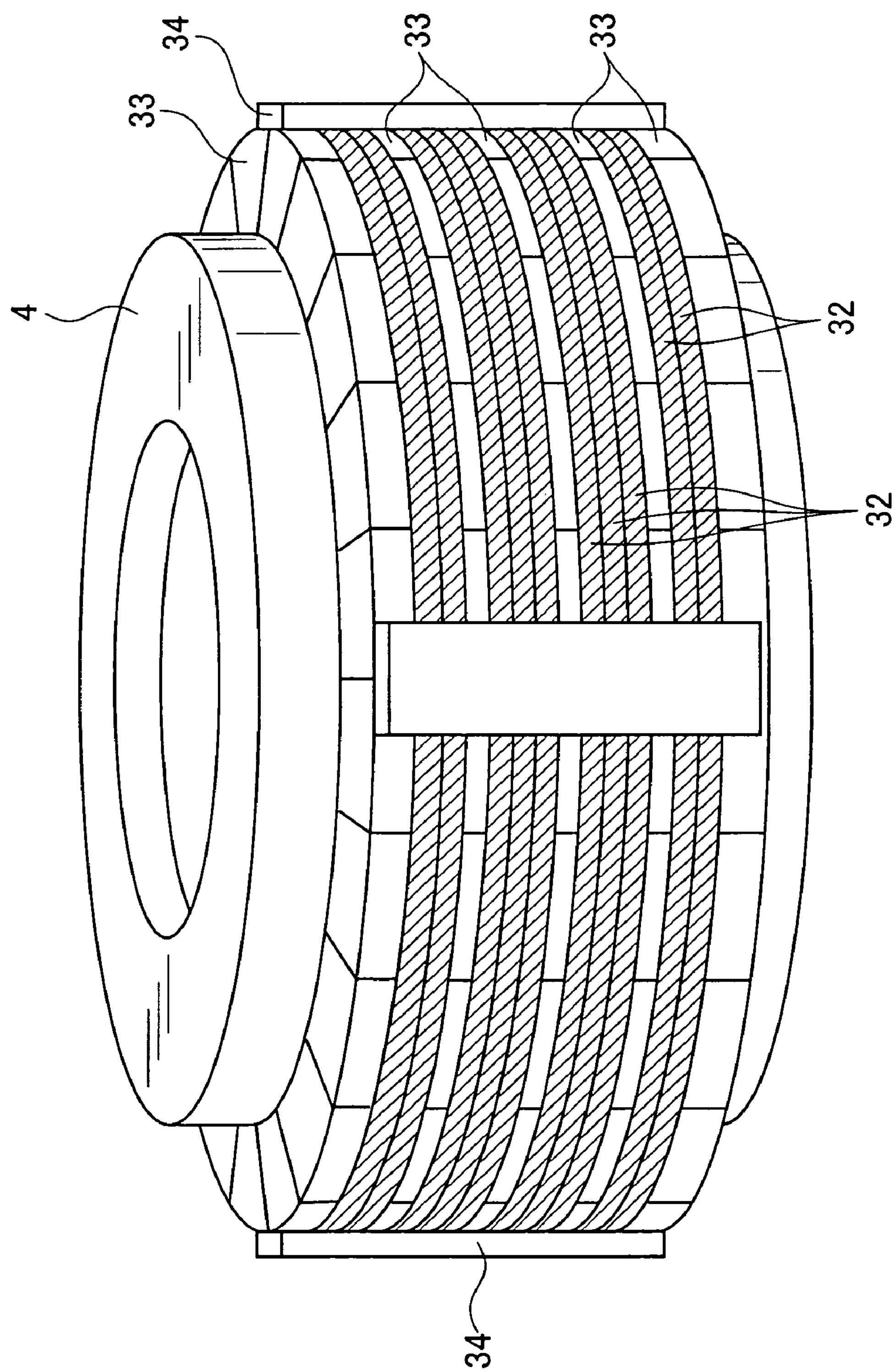
FIG. 13 is an outline view of the stator of the electric rotating machine according to the second embodiment of the invention.

As shown in FIGS. 12 and 13, a second embodiment of the invention differs from the first embodiment only in that the divided core members 33 are disposed at not only the axial ends of the stator core 33, but also at a position in between the laminated core members 32.

In the second embodiment, the number of joint portions between the stator cores 30 and the fittings 34 is larger than that in the first embodiment. Accordingly, the rigidity of the stator core 30 can be further improved compared to the first embodiment.

Other than this, the second embodiment provides the same advantages provided by the first embodiment.

Third Embodiment

A third embodiment of the invention differs from the first embodiment only in that the third embodiment uses a fitting 35 different from the fitting 34 used in the first embodiment to fix the core members 32 and the divided core members 33 together.

Figure 14:
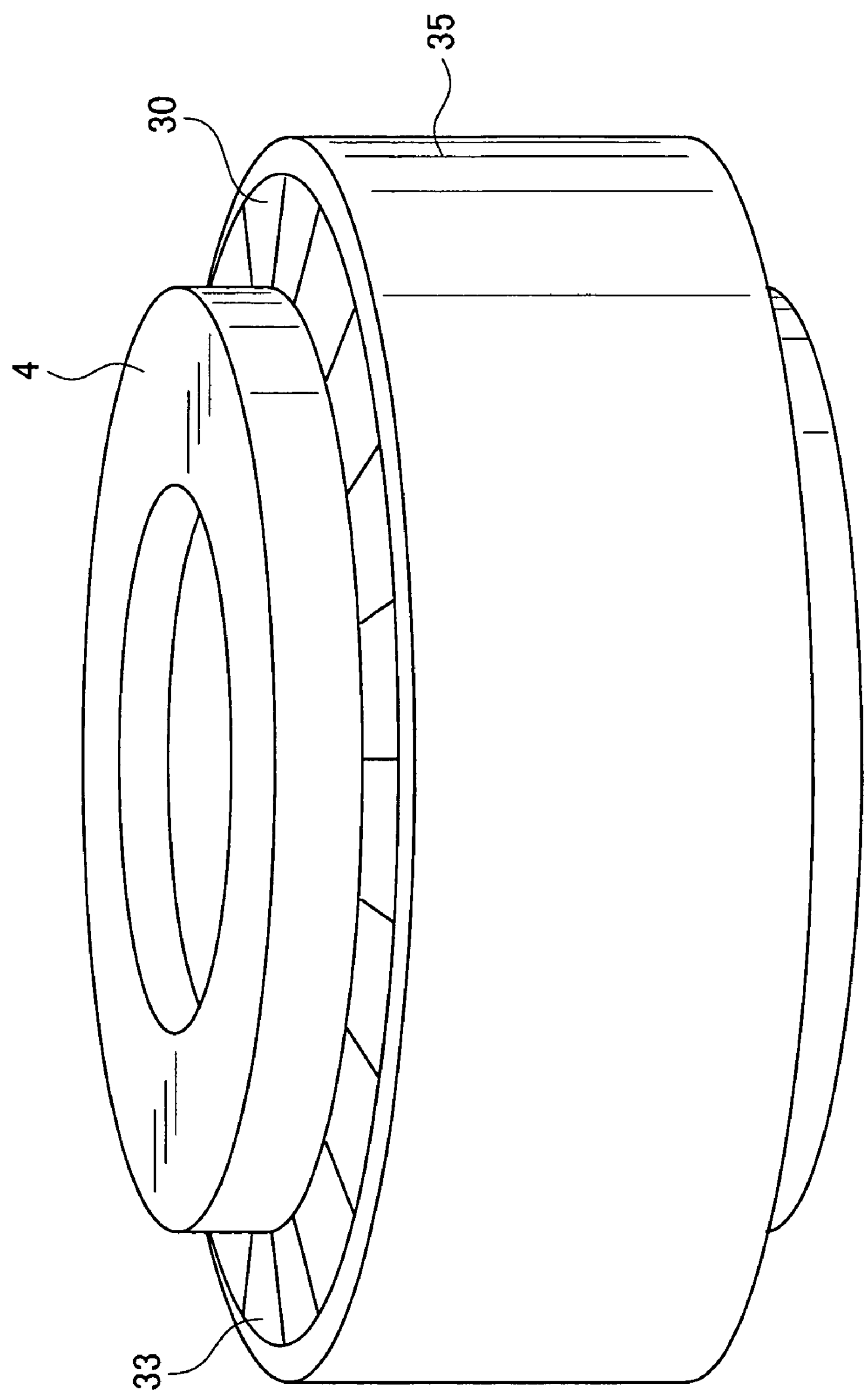
FIG. 14 is an outline view of the stator of the electric rotating machine according to a third embodiment of the invention.

As shown in FIG. 14, in the third embodiment, the fitting 35 joined to the divided core members 33 is a cylindrical member into which the laminated body of the core members 32 and the divided core members 33 are fitted. Accordingly, the rigidity of the stator core 30 can be further improved compared to the first embodiment.

Other than this, the third embodiment provides the same advantages provided by the first embodiment.

Fourth Embodiment

A fourth embodiment of the invention differs from the first embodiment only in that the shape of the tooth portions 320 after being folded back is different from that in the first embodiment.

Figure 15:
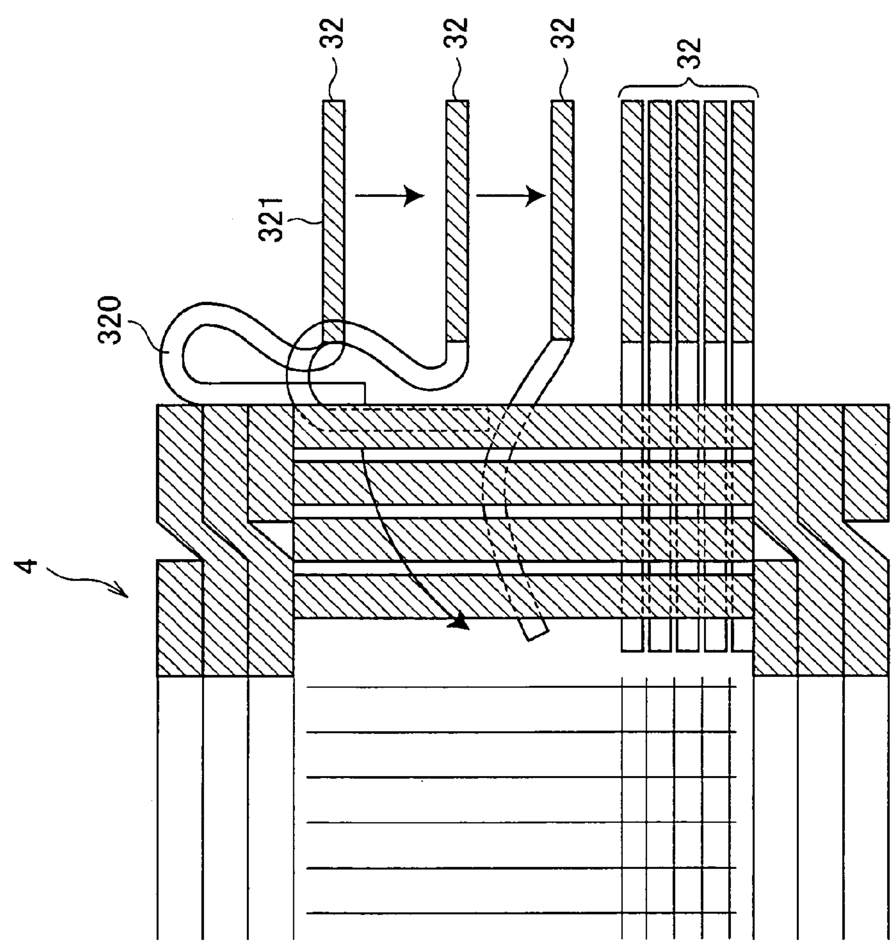
FIG. 15 is a diagram for explaining a method of assembling a stator of an electric rotating machine according to a fourth embodiment of the invention.

As shown in FIG. 15, in this embodiment, the front end portion of the tooth portion 320 is bent facing the direction in which the core member 32 is slid. By folding back the tooth portion 320 in a state of being bent, the distance between the core back portion 321 and the outer periphery of the stator winding 4 can be reduced.

Other than this, the fourth embodiment provides the same advantages provided by the first embodiment.

Fifth Embodiment

Figure 16:
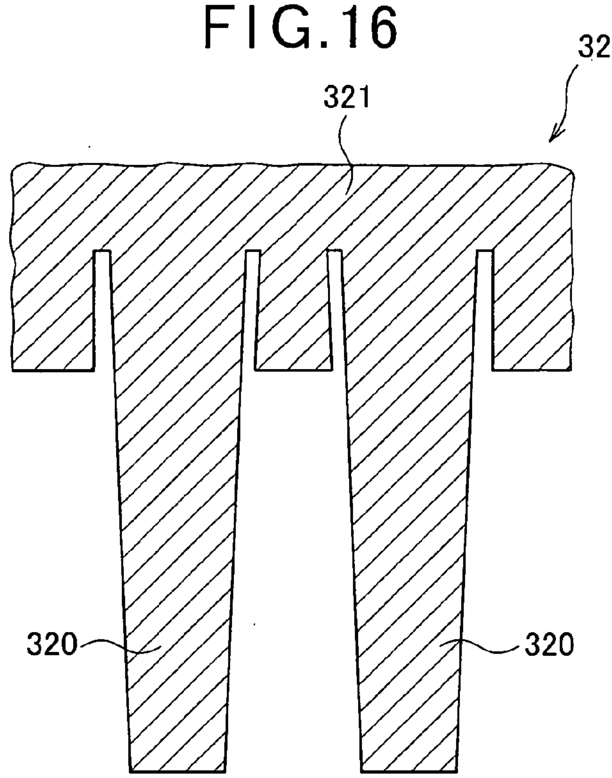
FIG. 16 is a partially enlarged view of a core member of a stator of an electric rotating machine according to a fifth embodiment of the invention.

A fifth embodiment of the invention differs from the first embodiment only in that the core member 32 is formed with slits extending along the tooth portions 320 at joint portions between the teeth portions 320 and the core back portion 320 as shown in FIG. 16.

In the fifth embodiment, since the tooth portions 320 can be folded back easily because of the provision of the slits, workability of assembling the core members 32 to the stator winding 4 can be improved.

Other than this, the fifth embodiment provides the same advantages provided by the first embodiment.

Sixth Embodiment

Figure 17:
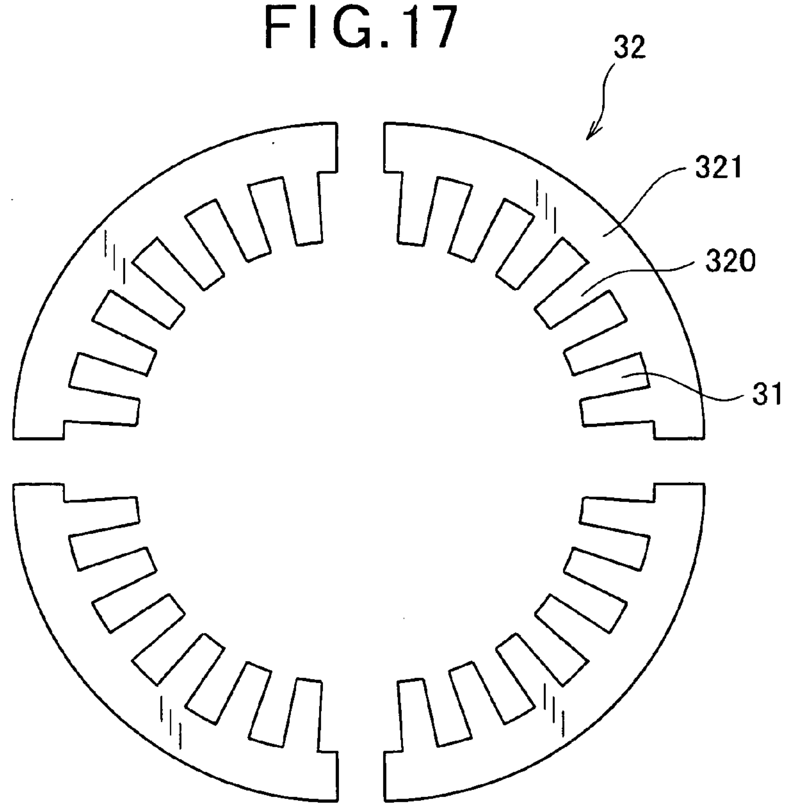
FIG. 17 is a diagram showing a structure of a core member of a stator of an electric rotating machine according to a sixth embodiment of the invention.

A sixth embodiment of the invention differs from the first embodiment only in that the core member 32 is evenly divided in the circumferential direction into a plurality of portions as shown in FIG. 17, while satisfying the requirement that the magnetic characteristic of the stator core 30 is not degraded. Other than this, the sixth embodiment provides the same advantages provided by the first embodiment.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a stator of an electric rotating machine, said stator comprising a stator core and a stator winding, the method comprising:

providing a plurality of core members for forming at least a portion of the stator core, each said core member having at least three first tooth portions to extend in a radial direction of said stator core and a core back portion integrally connecting said first tooth portions at a radially outer end side thereof, said first tooth portions defining slots therebetween at an inner periphery of the stator core along a circumferential direction thereof, each of said first tooth portions being selectively foldable or bendable to extend at least in part in a direction that is at an angle to said radial direction;

providing a stator winding constituted by wound conductive wires, said stator winding including in-slot portions adapted to be accommodated in said slots of the stator core and turn portions each connecting each adjacent two of said in-slot portions outside of said slots;

folding or bending the tooth portions of at least one of the core members thereby to form a hollow portion having d diameter that accommodates the stator winding at an axial center portion of the core member;

in the state of the tooth portions being folded or bent, inserting the stator winding into the hollow portion, and sliding the core member in the axial direction thereof; and when the core member reaches a predetermined axial position with respect to the stator winding, unfolding the tooth portions so that the tooth portions extend radially inwardly to assume substantially their original shape, whereby each of the tooth portions radially penetrates between the adjacent in-slot portions of the stator winding and each of the in-slot portions is accommodated between each adjacent two of the tooth portions.

2. The method according to claim 1, wherein each of the core members is successively assembled to the stator winding by folding or bending the tooth portions thereof and receiving the stator winding in the hollow portion defined thereby.

3. The method according to claim 1, wherein said tooth portions are resiliently flexible so that they resiliently flex to accommodate said stator winding, and they self-unfold to penetrate through the stator winding.

4. The method according to claim 1, wherein said providing a plurality of core members comprises providing core members having a ring-like shape core back portion.

5. The method according to claim 1, wherein said providing a plurality of core members comprises providing core members made of an amorphous metal plate.

6. The method according to claim 1, wherein said providing a stator winding comprises providing a stator winding having a shape of a cylinder having open ends, and said core members being slid along said stator winding from a side of one of said open ends to said predetermined axial position to be assembled to said stator winding.

7. The method according to claim 1, wherein said conductive wire has a rectangular cross-sectional shape.

8. The method according to claim 1, wherein said conductive wire is wound over an entire circumferential length of said stator core.

9. The method according to claim 1, wherein said conductive wire includes a conductor and an insulating film covering an outer surface of said conductor, said insulating film having a thickness from 100-200 μm.

10. The method according to claim 9, wherein said insulating film is constituted by an inner layer and an outer layer, a glass transition temperature of said outer layer being lower than that of said inner layer.

11. The method according to claim 9, wherein said insulating film is coated with a fusion member.

12. The method according to claim 9, wherein said conductor of said conductive wire is made of aluminum.

13. The method according to claim 2, further comprising: providing divided core members for forming at least a portion of the stator core, each of said divided core members being made of metal plate, and having at least two second tooth portions extending in said radial direction, and a core back portion integrally connecting said second tooth portions at a radially outer end side thereof.

14. The method according to claim 13, further comprising: assembling the divided core members to both axial ends of the previously assembled core members, the divided core members being assembled in a direction from radially outside of the stator winding to the axial center of the stator winding, thereby to fill gaps between axial end surfaces of the assembled core members and end surfaces of the stator winding.

15. The method according to claim 14, further comprising: joining band-like fittings to the divided core members assembled to the laminated body of the core members to complete the stator core.

16. A method of manufacturing an electric rotating machine comprising a stator and a rotor having magnet poles formed such that N poles and S poles alternate along a circumferential direction of said rotor so as to face an inner or outer periphery of said stator, said stator comprising a stator core and a stator winding, the method comprising:

providing a plurality of core members for forming at least a portion of the stator core, each said core member having at least three first tooth portions to extend in a radial direction of said stator core and a core back portion integrally connecting said first tooth portions at a radially outer end side thereof, said first tooth portions defining slots therebetween at an inner periphery of the stator core along a circumferential direction thereof, each of said first tooth portions being selectively foldable or bendable to extend at least in part in a direction that is at an angle to said radial direction;

providing a stator winding constituted by wound conductive wires, said stator winding including in-slot portions adapted to be accommodated in said slots of the stator core and turn portions each connecting each adjacent two of said in-slot portions outside of said slots;

folding or bending the tooth portions of at least one of the core members thereby to form a hollow portion having a diameter that accommodates the stator winding at an axial center portion of the core member;

in the state of the tooth portions being folded or bent, inserting the stator winding into the hollow portion, and sliding the core member in the axial direction thereof; and when the core member reaches a predetermined axial position with respect to the stator winding, unfolding the tooth portions so that the tooth portions extend radially inwardly to assume substantially their original shape, whereby each of the tooth portions radially penetrates between the adjacent in-slot portions of the stator winding and each of the in-slot portions.

* * * * *

UNITED STATES PATENT AND TRADEMARK OFFICE

CERTIFICATE OF CORRECTION

PATENT NO. : 7,814,642 B1
APPLICATION NO. : 12/801706
DATED : October 19, 2010
INVENTOR(S) : Onimaru et al.

It is certified that error appears in the above-identified patent and that said Letters Patent is hereby corrected as shown below:

Claim 1, at column 7, line 22, “d” should be --a--; and

Claim 16, at column 8, line 64, after “in-slot portions”, the following phrase should be added: --is accommodated between each adjacent two of the tooth portions--

Signed and Sealed this
Fourth Day of January, 2011

David J. Kappos
*Director of the United States Patent and Trademark Office*